Figure 1:
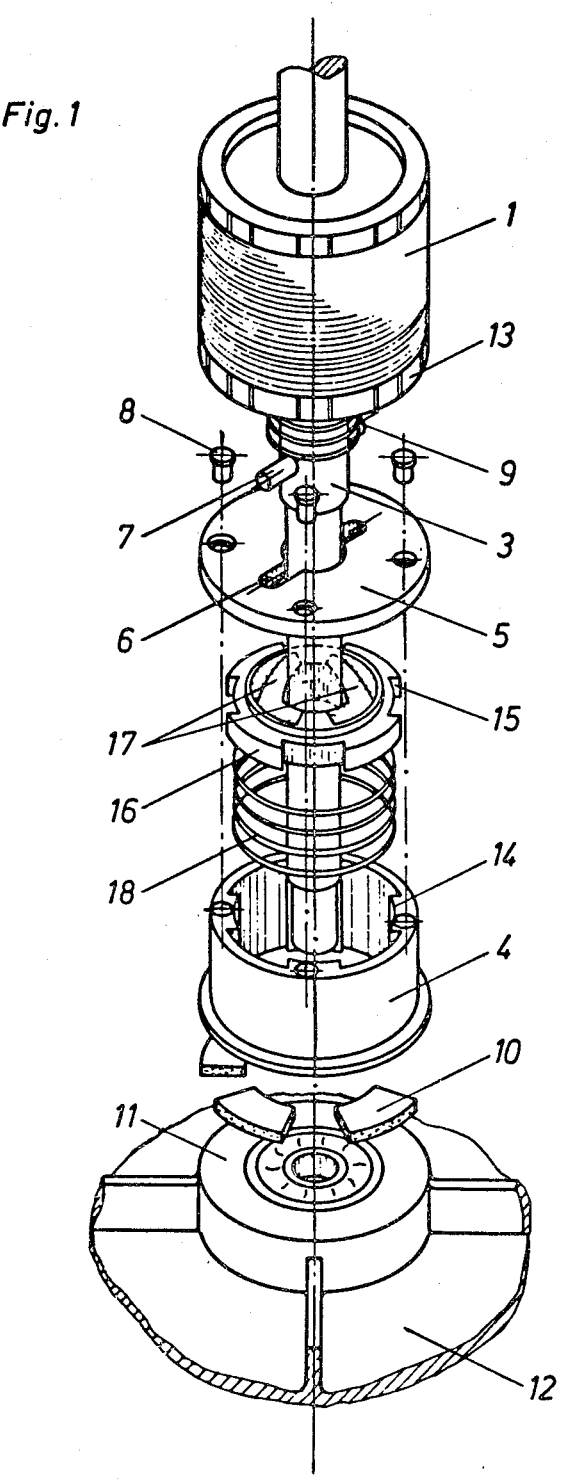

United States Patent [19]

Haverkamp et al.

[11] 4,381,048
[45] Apr. 26, 1983

[54] ELECTRIC MOTOR WITH AUTOMATICALLY ACTING BRAKE

[75] Inventors: Hans Haverkamp, Oerlinghausen; Walter Wistinghausen, Detmold, both of Fed. Rep. of Germany

[73] Assignee: Hanning Elektro-Werke GmbH & Co., Bielefeld, Fed. Rep. of Germany

[21] Appl. No.: 302,192

[22] Filed: Sep. 14, 1981

[30] Foreign Application Priority Data

Sep. 25, 1980 [DE] Fed. Rep. of Germany ....... 3036091

[51] Int. Cl.³ .......................................... B60T 13/04
[52] U.S. Cl. .................................. 188/171; 188/72.7; 192/2; 310/77; 310/92
[58] Field of Search ....................... 310/74, 76, 77, 79, 310/92, 93, 80, 10; 188/72.7, 72.8, 171, 173; 192/2, 18

[56] References Cited

U.S. PATENT DOCUMENTS

| | | | |
|---|---|---|---|
| 2,536,491 | 1/1951 | Chapman | 310/77 |
| 2,543,830 | 10/1945 | Burrus | 310/77 |
| 2,617,051 | 11/1952 | Fuge | 310/76 |
| 2,809,309 | 10/1957 | Evans | 310/77 |
| 2,827,135 | 3/1958 | Sorchy | 310/77 |
| 2,827,136 | 3/1958 | Sorchy | 310/77 |
| 4,033,435 | 7/1977 | Bayliss | 188/173 |

FOREIGN PATENT DOCUMENTS

| | | | |
|---|---|---|---|
| 2814200 | 10/1979 | Fed. Rep. of Germany | 188/171 |
| 375424 | 2/1964 | Switzerland | 310/77 |
| 704914 | 3/1954 | United Kingdom | 310/77 |
| 945358 | 12/1963 | United Kingdom | 310/77 |

Primary Examiner—R. Skudy
Attorney, Agent, or Firm—Max Fogiel

[57] ABSTRACT

An electric motor with automatically acting brake, which possesses a brake element including an armature plate and displaceable on the rotor shaft against a helical spring, and released by the magnetic field of the rotor. The brake element axially guides a disc possessing guide grooves situated between it and the armature plate. The inclined planes of the disc are facing towards the rotor and extending around the rotor shaft in the form of annular segments are disposed axially symmetrically on this disc, which are pressed by a prestressed spring bearing against the brake element onto a starting pin inserted into the rotor shaft.

5 Claims, 3 Drawing Figures

ELECTRIC MOTOR WITH AUTOMATICALLY ACTING BRAKE

This invention relates to an electric motor with automatically acting brake, which possesses a brake element comprising an armature plate and displaceable on the rotor shaft against an energy store, such as particularly a helical spring, and released by the magnetic field of the rotor, which (element) axially guides a disc possessing guide grooves situated between it and the armature plate, whereby inclined planes facing towards the rotor and extending around the rotor shaft in the form of annular segments are disposed axially symmetrically on this disc, which (planes) are pressed by means of a prestressed spring bearing against the braking element onto a starting pin inserted into the rotor shaft.

Such electric motors, equipped with a spring pressure brake, the basic construction of which corresponds to the design known from DE-OS No. 28 05 063, are known from practice. They offer the advantage of a safety device for the appliances driven by them, in that their slowing down times are appreciably shortened and the tool is thus stopped as rapidly as possible. In this manner a braking effect is achieved which always comes into action reliably when no current is flowing and which consequently also occurs in the case of an unintentional current failure. Since for the releasing of the brake the magnetic field present in the electric motor is used, the additional cost of such braking devices is low.

The task underlying the present invention is to make available in simple manner an electric motor of the initially named category, which operates with little wear in trouble-free and maintenance-free manner and which can be used for all the cases in question, such as for example also for machines which are reversible in rotational direction. The system of the present invention shall be suitable for inexpensive mass production with largely automated manufacture.

To solve the stated task it is proposed that the brake element shall be formed in the manner of a pot seating the prestressed spring and shall be closed towards the rotor by the armature plate, which possesses recesses for the passage of the starting pin of the rotor shaft on assembly, and that the brake element shall possess, on its inner surface, guide noses for engagement into the guide grooves of the disc equipped with the inclined planes and movable on the rotor shaft independently of the armature plate, whereby the inclined planes of this disc shall be constructed ascending in both rotational directions of the rotor shaft. In an advantageous further embodiment of the subject of this invention, devices are provided which have the effect that the disc equipped with the inclined planes and the starting pin of the rotor shaft are brought each into a position relative to one another during the stopping of the rotor shaft or the releasing operation of the brake element, in which (position) the starting pin is situated in the lowest region of the inclined planes. Furthermore, it has been found advantageous for asymmetrically distributed brake linings to be fitted on the brake element, which (linings) act during the braking operation on an unmachined light metal cast surface.

By the invention a safety brake with brake force intensification has been created, which can be preassembled as a complete unit. The closed construction chosen here for the brake device results in a dust-proof arrangement, and the pot-like form of the brake element provides a grease chamber for its maintenance-free operation.

Figure 2:
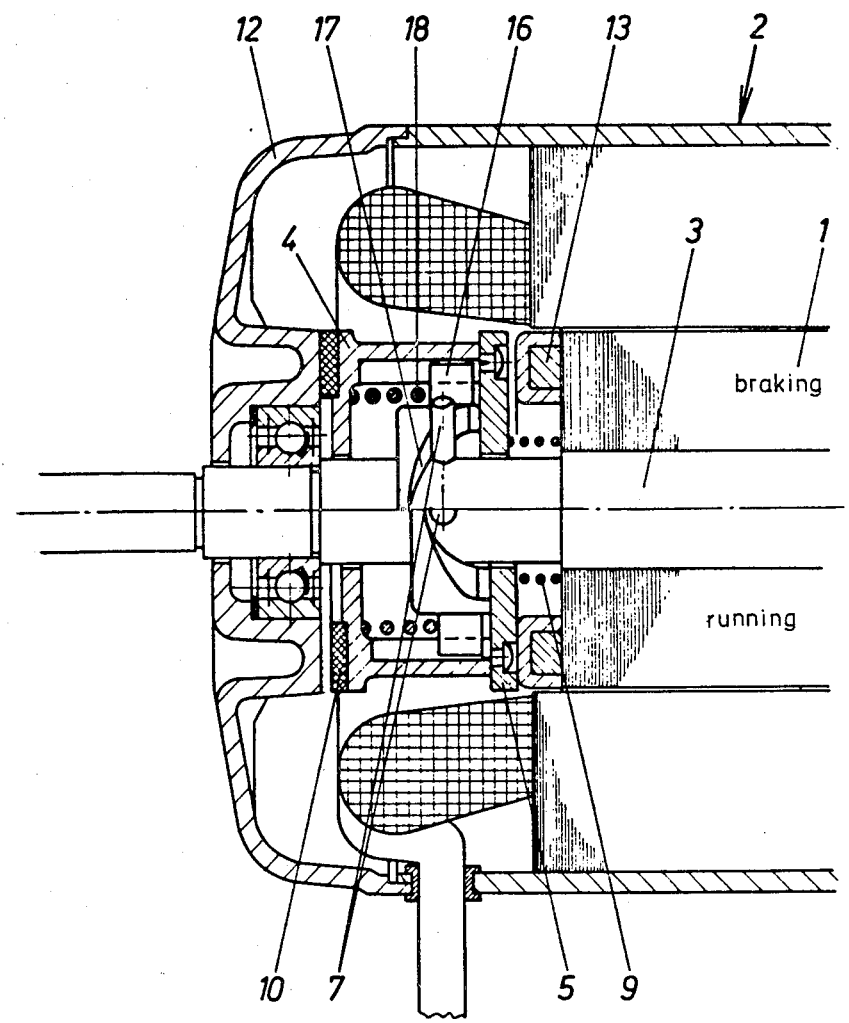
Figure 3:
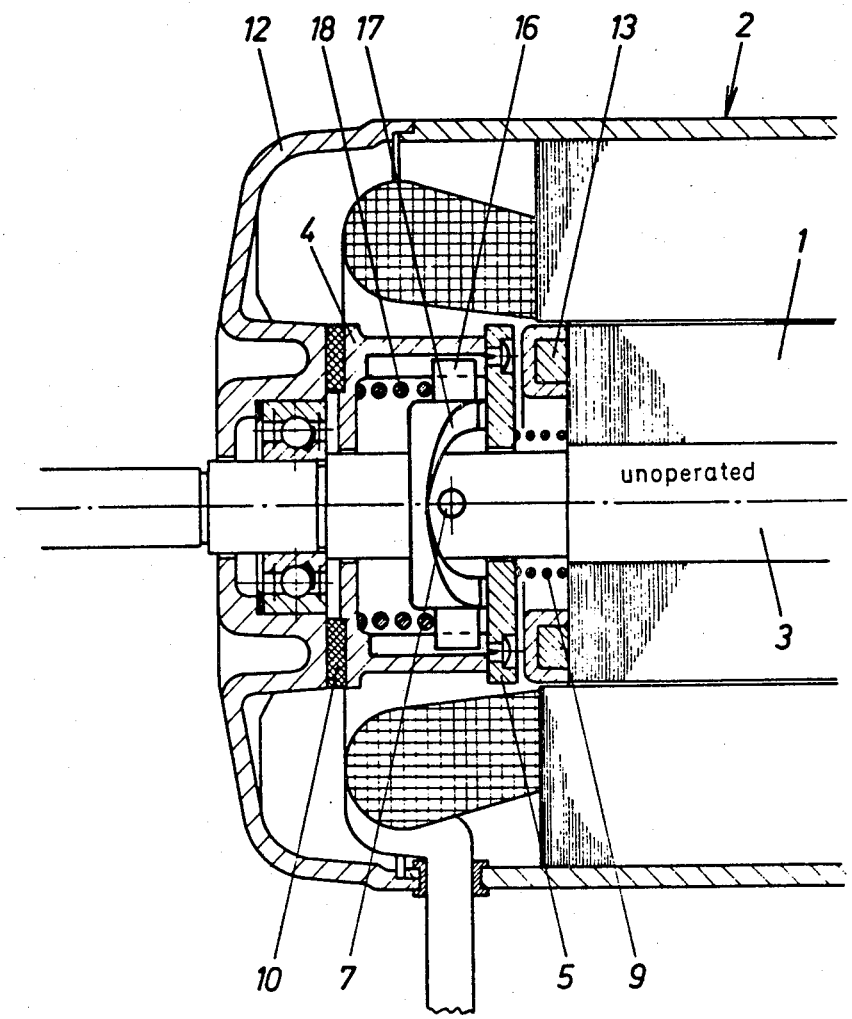

An example of embodiment of the invention is described below with reference to the drawings. The drawings show in detail:

FIG. 1 an exploded view of a spring pressure brake possessing the features of this invention of an electric motor, FIG. 2 an axial section through the brake device illustrated in FIG. 1 showing its positions during running and during braking of the electric motor, and FIG. 3 an axial section from FIG. 2 with the at-rest position of the brake device with the electric motor stopped.

The automatically acting brake illustrated in the drawings is associated with the rotor 1 of the illustrated asynchronous motor 2 and is mounted on its rotor shaft 3. It possesses a pot-shaped brake element 4, which is closed towards the rotor 1 by an armature plate 5. This armature plate 5 possesses recesses 6 for the passage during assembly of a starting pin 7 inserted radially into the rotor shaft 3 and is fixed by means of notched nails 8 to the brake element 4. The brake element 4 equipped with the armature plate 5 is displaceable on the rotor shaft 3 against a helical spring 9 bearing at the other end against the rotor 1, whereby the helical spring 9 constituting an energy store presses the brake element 4, equipped with asymmetrically arranged brake linings 10, against an unmachined light metal cast surface 11 of the motor bearing plate 12 when the armature plate 5 and thus the brake element 4 are not pulled up by the magnetic field of the short-circuit ring 13 mounted on the rotor 1 when the motor is switched on.

On its inner surface, the brake element 4 carries guide noses 14, which engage into guide grooves 15 of a disc 16 movable independently of the armature plate 5 on the rotor shaft 3. This disc 16, situated between the the end portion of the brake element 4 and the armature plate 5, is equipped with axially symmetrically arranged inclined planes 17, facing towards the rotor 1 and extending in the manner of annular segments around the rotor shaft 3, whereby these inclined planes 17 are constructed ascending in both rotational directions of the rotor shaft 3. As can be seen from FIGS. 2 and 3, the disc 16 furnished with the inclined planes 17 is pressed by means of a prestressed spring 18 bearing against the brake element 4 in the direction of the starting pin 7 inserted into the rotor shaft 3. The method of functioning of the braking device explained above in its details can be seen from FIGS. 2 and 3.

After the asynchronous motor 2 illustrated has been switched on, the armature plate 5 of the brake element 4 is attracted by the short-circuit ring 13 of the rotor 1 against the force of the helical spring 9 and thus the brake is released, so that the state shown in the lower part of FIG. 2 results. The brake element 4 is held with all its parts against the rotor 1 by the magnetic force and revolves with this rotor.

As soon as the excitation current of the asynchronous motor 2 is interrupted, the helical spring 9 separates the armature plate 5 from the short-circuit ring 13 of the rotor 1 and brings the brake linings 10 into bearing against the engine bearing plate 12. The thus automatically initiated braking operation which can be seen from the upper sectioned half of FIG. 2 is still further intensified by the starting pin 7 moving upwards in the rotor rotational direction on the inclined planes 17 of the disc 16 and the already prestressed spring 18 being compressed by the amount of ascent along these inclined planes 17.

After the braking operation is fully completed, the starting pin 7 slides along the inclined planes 17 of the disc 16 back into the at-rest position shown in FIG. 3, whereupon the brake system is ready for a renewed starting of the asynchronous motor 2. In this way it is assured that the starting pin 7 of the rotor shaft 3 is always situated while the rotor shaft 3 is stopped in the lowest region of the inclined planes 17, and for example the helical spring 9 may possess cranked ends, by which it engages respectively into the armature plate 5 and into the rotor 1 and consequently always rotates the rotor 1 into the at-rest position illustrated in FIG. 3.

By appropriate design of the aforementioned spring 18, the braking torque can be adapted to the appliance which is to be driven by the motor 2. The presence of this facility is extremely important, because there are machines in which a very sharply acting braking operation is not desired because tools can then become loosened or other drawbacks can occur.

Because the inclined planes 17 which come into engagement with the starting pin 7 of the rotor shaft 3 are constructed ascending in both directions of rotation of the rotor shaft 3, the asynchronous motor 2 which has been described can be operated in either the right or the left direction. In both rotational directions an equally large braking action is then obtained, which may be regarded as an especial advantage.

As a consequence of the fact that the brake linings 10 of the brake element 4 become active during the braking operation on the unmachined light metal cast surface 11 of the motor bearing plate 12, furrows are not produced as would be the case with a machined, i.e. polished brake surface. The resultant high wear of the brake linings 10 and increasingly long braking times are consequently avoided.

Instead, as a consequence of the unmachined brake surface 11, short braking times exist. Due to the asymmetrical arrangement of the brake linings 10 on the brake element 4, the result is achieved that during the braking operation vibrations and thereby unpleasant noises are avoided.

We claim:

1. Electric motor with automatically acting brake and rotor shaft, which possesses a brake element comprising: an armature plate displaceable on the rotor shaft against first spring means, and released by the magnetic field of the rotor, a disc having guide grooves and located between said element and the armature plate, said disc being axially guided by said element, inclined planes comprised of annular segments facing towards the rotor and extending around the rotor shaft and being disposed axially symmetrically on said disc, said planes being pressed by second spring means bearing against the brake element onto a starting pin inserted into the rotor shaft, said brake element being formed as a pot seating said second spring means and being closed towards the rotor by said armature plate, said armature plate having recesses for the passage of the starting pin of the rotor shaft, said brake element having on its internal surface guide noses for engagement into the guide grooves of said disc, said disc being provided with the inclined planes and being movable on the rotor shaft independently of said armature plate, said inclined planes being arranged ascending in both directions of rotation of the rotor shaft; said second spring means comprising a centrally located spring in said brake element for amplifying the braking force.

2. Electric motor according to claim 1, including means for bringing the disc and the starting pin of the rotor shaft into a position relative to one another during stopping of the rotor shaft and during releasing of the brake element, said starting pin being situated in the lowest region of the inclined planes when in said position.

3. Electric motor according to claim 1, including asymmetrically distributed brake linings mounted on the brake element.

4. Electric motor according to claim 3, wherein said brake linings act during braking operation on an unmachined light metal cast surface.

5. Electric motor according to claim 1, including means for bringing the disc and the starting pin of the rotor shaft into a position relative to one another during stopping of the rotor shaft and during releasing of the brake element, said starting pin being situated in the lowest region of the inclined planes when in said position asymetrically distributed brake linings mounted on the brake element, said brake linings acting during braking operation on an unmachined light metal cast surface.

* * * * *